United States Patent [19]

Fujimoto et al.

[11] Patent Number: 4,806,588

[45] Date of Patent: Feb. 21, 1989

[54] POLYESTER RESIN COMPOSITION

[75] Inventors: Susumu Fujimoto; Shigeo Kobayashi, both of Ohtsu, Japan

[73] Assignee: Toyo Boseki Kabushiki Kaisha, Osaka, Japan

[21] Appl. No.: 34,445

[22] Filed: Apr. 6, 1987

[30] Foreign Application Priority Data

Apr. 15, 1986 [JP] Japan .................................. 61-86662
Dec. 27, 1986 [JP] Japan ................................. 61-315217

[51] Int. Cl.$^4$ ............................................. C08L 67/02
[52] U.S. Cl. .................... 524/505; 524/513; 525/92; 525/173; 525/174; 525/176
[58] Field of Search ................. 525/176, 173, 174, 92; 524/505, 513

[56] References Cited

U.S. PATENT DOCUMENTS

| | | | |
|---|---|---|---|
| 3,639,527 | 2/1972 | Brinkmann | 525/919 |
| 3,959,215 | 5/1976 | Schneider | 528/289 |
| 4,010,222 | 2/1977 | Shih | 525/176 |
| 4,172,859 | 10/1979 | Epstein | 525/109 |
| 4,322,335 | 3/1982 | Nield | 523/522 |
| 4,543,396 | 9/1985 | Arai | 525/440 |

FOREIGN PATENT DOCUMENTS 1431916  4/1976  United Kingdom .

Primary Examiner—Patricia Short

[57] ABSTRACT

A polyester resin composition which comprises
(A) polyethylene terephthalate or a copolyester containing at least 80 mol % of ethylene terephthalate repeating unit.
(B) a metal salt of a copolymer composed of α-olefin and α,β-unsaturated carboxylic acid,
(C) a polyvalent oxazoline compound of the formula:

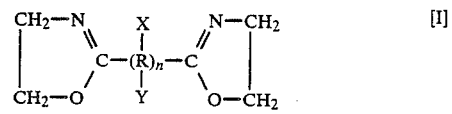

wherein R is an aliphatic or aromatic hydrocarbon group such as alkylene or arylene having 1 to 24 carbon atoms optionally substituted with lower alkyl having 1 to 6 carbon atoms or aryl having 6 to 19 carbon atoms; n is 0 or 1; X and Y are hydrogen or 2-oxazoline group, when n is 1, or no X and Y are present, when n is 0; and all oxazoline may be substituted with lower alkyl having 1 to 6 carbon atoms or aryl having 6 to 19 carbon atoms, and optionally
(D) a polyester elastomer.

3 Claims, No Drawings

POLYESTER RESIN COMPOSITION

FIELD OF THE INVENTION

The present invention relates to a polyester resin composition for molding. More particularly, the polyester resin composition of the present invention provides a molded product in which crystallization progresses to the surface layer thereof even when molding is carried out at a mold temperature of not more than 100° C. Further, a molded product of the polyester resin composition of the present invention has good dimensional stability as well as excellent mechanical properties such as impact resistance, heat distortion temperature, tensile strength, tensile elongation and the like.

BACKGROUND OF THE INVENTION

Polyethylene terephthalate is excellent in mechanical properties, electrical properties, heat resistance, chemical resistance and the like, and is used in various industrial products in the form of fibers or films. In the case of using polyethylene terephthalate as fibers or films, usually, they are subjected to stretching.

On the other hand, when polyethylene terephthalate is used for plastic articles, for example, as injection-molded products, it is known that many problems are present in molding, and further in respect of physical properties of molded products. In order to solve these problems, several techniques have been proposed.

For example, Japanese Patent Kokoku No. 44-457 discloses addition of glass fiber to improve heat distortion temperature. Japanese Patent Kokai No. 55-60553 discloses that crystallization sufficiently progresses even at a low mold temperature such as 80° to 90° C. by addition of a polyoxyalkylene compound having epoxy group and an elastomeric polyester having a glass transition temperature of not more than 10° C. Further, Japanese Patent Kokoku No. 45-26225 discloses addition of a metal salt of a copolymer composed of α-olefin and α,β-unsaturated carboxylic acid to a thermoplastic polyester to increase crystallization rate.

However, in the technique of the above Japanese Patent Kokoku No. 44-457, crystallization does not progress to the surface layer of a molded product, unless a high mold temperature such as 120° to 140° C. is employed. Therefore, a problem still remains in molding at a low mold temperature. In the technique of Japanese Patent Kokai No. 55-60553, crystallization progresses to the surface layer of a molded product even at a low mold temperature such as 80° to 90° C. and molding characteristics at a low temperature are considerably improved. However, usually, the maximum mold temperature is about 80° C. because hot water is used to control the temperature of a mold, and therefore molding characteristics at a low temperature are still insufficient. Further, in the technique of Japanese Patent Kokobu No. 45-26225, although molding characteristics at a low mold temperature are improved, there is such a problem that mechanical properties such as tensile strength, tensile elongation at break, impact resistance and the like tend to lower.

OBJECTS AND SUMMARY OF THE INVENTION

One object of the present invention is to provide a polyester resin composition a molded product of which has good release properties and a high heat distortion temperature, even if molding is carried out at a low mold temperature of not higher than 80° C.

Another object of the present invention is to provide a polyester resin composition a molded product of which has excellent mechanical properties such as impact resistance, tensile strength, tensile elongation at break and the like.

These objects as well as other objects and advantages of the present invention will become apparent to those skilled in the art from the following description.

According to the present invention, there is provided a polyester resin composition which comprises (A) polyethylene terephthalate or a polyester copolymer containing at least 80 mol % of ethylene terephthalate repeating unit, (B) a metal salt of a copolymer composed of α-olefin and α,β-unsaturated carboxylic acid (hereinafter referred to as "onomer salt"), (C) a polyvalent oxazoline compound of the formula:

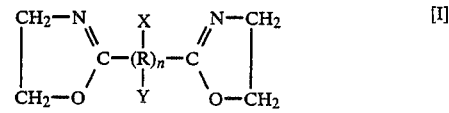

wherein R is an aliphatic or aromatic hydrocarbon group such as alkylene or arylene having 1 to 24 carbon atoms optionally substituted with lower alkyl having 1 to 6 carbon atoms or aryl having 6 to 19 carbon atoms; n is 0 or 1; X and Y are hydrogen or 2-oxazoline group, when n is 1, or no X and Y are present, when n is 0; and all the oxazoline groups may be substituted with lower alkyl having 1 to 6 carbon atoms or aryl having 6 to 19 carbon atoms, and optionally (D) a polyester elastomer.

DETAILED EXPLANATION OF THE INVENTION

The polyester resin (A) used in the present invention is polyethylene terephthalate obtained from terephthalic acid or its lower alkyl ester and ethylene glycol, or a polyester copolymer containing at least 80 mol % preferably, not less than 90 mol % of ethylene terephthalate repeating unit. As the copolymerizable component, a wide variety of acid components and/or glycol components can be used. Examples of the acid components include isophthalic acid, naphthalene-1,4- or 2,5-dicarboxylic acid, diphenyl ether-4,4'-dicarboxylic acid, adipic acid, sebacic acid and the like. Examples of the glycol components include propylene glycol, butylene glycol, diethylene glycol, dipropylene glycol, neopentyl glycol, cyclohexane dimethanol, 2,2-bis(4-hydroxyphenyl)propane, 2,2-bis(4-hydroxy-2,3,5,6-tetrabromophenyl)propane and the like. Further, there can be used a hydroxy acid such as p-hydroxybenzoic acid, p-hydroxyethoxybenzoic acid and the like as the copolymerizable component. Furthermore, a small amount of a trifunctional component can be copolymerized in such an extent that molding characteristics are not adversely affected. Preferably, the polyester resin has an intrinsic viscosity measured in a mixed solvent of phenol/tetrachloroethane (6/4, w/w) at 30° C. of not less than 0.5, more preferably, not less than 0.55.

Examples of the ionomer salt (B) used in the present invention include a metal salt of a copolymer of olefin chain such as ethylene, propylene, butene-1 and the like and acrylic or methacrylic acid; a metal salt of a copolymer of olefin chain and maleic anhydride; a metal salt of a copolymer of styrene and acrylic or methacrylic acid; and a metal salt of a copolymer of styrene and maleic anhydride. Usually, a metal salt of a copolymer of olefin and acrylic or methacrylic acid, or a metal salt of a copolymer styrene and acrylic or methacrylic acid is used. As a metal which forms a salt with the carboxylic group, there can be used alkali metals, alkaline earth metals, periodic table group III metals such as Al and B and the like. Among them, alkali metals, particularly, sodium and potassium are preferred because of their effect on crystallization rate.

The ingredient (C) used in the present invention is an oxazoline compound represented by the above formula [I]. Although the oxazoline ring is shown as one of possible configurations in the formula [I], it should be construed that all other configurations are also represented by the above the formula. Examples of the oxazoline compound include 2,2'-methylene-bis(2-oxazoline), 2,2'-ethylene-bis(2-oxazoline), 2,2'-ethylene-bis(4-methyl-2-oxazoline), 2,2'-propylene-bis(2-oxazoline), 2,2'-tetramethylene-bis(2-oxazoline), 2,2'-hexamethylene-bis(2-oxazoline), 2,2'-octamethylene-bis(2-oxazoline), 2,2'-p-phenylene-bis(2-oxazoline), 2,2'-phenylene-bis(4-methyl-2-oxazoline), 2,2'-p-phenylene-bis(4,4'-dimethyl-2-oxazoline), 2,2'-p-phenylene-bis(4-phenyl-2-oxazoline), 2,2'-m-phenylene-bis(2-oxazoline), 2,2'-m-phenylene-bis(4-methyl-2-oxazoline), 2,2'-m-phenylene-bis(4,4'-dimethyl-2-oxazoline), 2,2'-m-phenylene-bis(4-phenyl-2-oxazoline), 2,2'-o-phenylene-bis(2-oxazoline), 2,2'-o-phenylene-bis(4-methyl-2-oxazoline), 2,2'-bis(2-oxazoline), 2,2'-bis(4-methyl-2oxazoline), 2,2'-bis(4-ethyl-2-oxazoline), 2,2'-bis(4-phenyl-2-oxazoline), tri(2-oxazoline)methane, 1,1,2-tri(2-oxazoline)ethane, 1,1,3-tri(2-oxazoline)propane, 1,2,3-tri(2-oxazoline)propane, 1,1,4-tri(2-oxazoline)butane, 1,2,4-tri(2-oxazoline)butane, 1,1,5-tri(2-oxazoline)pentane, 1,2,5-tri(2-oxazoline)pentane, 1,1,6-tri(2-oxazoline)hexane, 1,2,6-tri(2-oxazoline)hexane, 1,3,5-tri(2-oxazoline)benzene and the like.

Preferred examples of the polyester elastomer used as the ingredient (D) include polyether ester block copolymers, polyester ester block copolymers and polyether-ester ester block copolymers composed of aromatic polyesters as hard segments and poly(alkyleneoxide)-glycols and/or aliphatic polyesters as soft segments.

The aromatic polyester of the hard segment is a polymer obtained by polycondensation of a dicarboxylic acid component usually containing about 60 mol % of terephthalic acid component and a diol component. The acid component other than terephthalic acid and the diol component may be those described above with respect to the polyester resin (A). As the aromatic polyester, preferably, there can be used polyethylene terephthalate, polybutylene terephthalate, polyethylene (terephthalate/isophthalate), polybutylene (terephthalate/isophthalate) and the like.

As the poly(alkylene oxide)glycol and the aliphatic polyester of the above soft segment, preferably, there can be used polyethylene glycol, poly(1,2- and 1,3-propylene oxide)glycol, poly(tetramethylene oxide)glycol, a copolymer of ethylene oxide and propylene oxide, a copolymer of ethylene oxide and tetrahydrofuran, polyethylene adipate, polybutylene adipate, pol-ε-caprolactone, polyethylene sebacate, polybutylene sebacate and the like.

The weight ratio of the hard segment/soft segment in the polyester elastomer (D) is 95/5 to 10/90, preferably, 90/10 to 30/70. Examples of the polyester elastomer (D) include polyethylene terephthalate-polyethylene glycol block copolymer, polyethylene terephthalate-poly(tetramethylene oxide)glycol block copolymer, polyethylene terephthalate/isophthalate-poly(tetramethylene oxide)glycol block copolymer, polybutylene terephthalate-poly(tetramethylene oxide)glycol block copolymer, polybutylene terephthalate/isophthalate-poly(tetramethylene oxide)glycol block copolymer, polybutylene terephthalate/decane dicarboxylate-poly(tetramethylene oxide)glycol block copolymer, polybutylene terephthalate-poly(propylene oxide/ethylene oxide)glycol block copolymer, polybutylene terephthalate/isophthalate-poly(propylene oxide/ethylene oxide)glycol block copolymer, polybutylene terephthalate/decane dicarboxylate-poly(propylene oxide/ethylene oxide)glycol block copolymer, polybutylene terephthalate-poly(ethylene oxide)glycol block copolymer, polybutylene terephthalate-polyethylene adipate block copolymer, polybutylene terephthalate-polybutylene adipate block copolymer, polybutylene terephthalate-polybutylene sebacate block copolymer, polybutylene terephthalate-poly-ε-caprolactone block copolymer and the like. Among these polyester elastomers (D), polyethylene terephthalate-polyethylene glycol block copolymer, polybutylene terephthalate-poly-ε-caprolactone block copolymer, polyethylene terephthalate-poly-ε-caprolactone block copolymer and polybutylene terephthalate-poly(tetramethylene oxide)-glycol block copolymer are particularly preferred. Further, preferably, these polyester elastomers (D) have the intrinsic viscosity of 0.8 to 3.0, particularly, 1.0 to 2.0, when it is measured by the same method as in the above polyester resin (A). Furthermore, these polyester elastomers (D) can be used in combination thereof.

In the polyester resin composition of the present invention, the ingredient (B) can be formulated in an amount of 0.1 to 30 parts by weight, particularly, 2 to 20 parts by weight per 100 parts by weight of the polyester resin (A). When the amount is outside of this range, heat distortion temperature becomes low and, therefore, the above range is preferred. The ingredient (C) can be formulated in an amount of 0.01 to 10 parts by weight, particularly, 0.5 to 5.0 parts by weight per 100 parts by weight of the polyester resin (A). When the amount is less than 0.01 part by weight, both heat distortion temperature and mechanical strength become low. On the other hand, when the amount is more than 10 parts by weight, uniform formulation is hardly effected, which results in variable quality, although heat distortion temperature is unchanged.

Optionally, in the polyester resin composition of the present invention, the ingredient (D) can be formulated in such an amount that the amount of the ingredient (B) is 0.1 to 20 parts by weight, preferably, 3 to 10 parts by weight per 100 parts by weight of the total amount of the ingredients (A) and (D). Further, the amount of the ingredient (C) is 0.01 to 10 parts by weight, preferably, 0.1 to 5.0 parts by weight per 100 parts by weight of the total amount of the ingredients (A) and (D). In this case, when the amount of the ingredient (C) is less than 0.01 part by weight, both heat distortion temperature and mechanical strength become low. On the other hand, when the amount is more than 10 parts by weight, uniform formulation is hardly effected, which results in inconstant quality, although heat distortion temperature is unchanged. By the way, the weight ratio of the ingredients (A):(D) can be varied in a wide range such as 0.1 to 99.9:99.9 to 0.1, and the ratio can be suitably chosen based on the ratio of the hard segment and the soft segment in the ingredient (D).

According to a particular purpose and use, the composition of the present invention can contain various additives such as fibrous reinforcing materials, stabilizers (e.g., antioxidants, UV absorbing agents, etc.), plasticizer, lubricants, flame-retardants, antistatic agents, colorants, mold release agents, metallic powders and the like. In the case of using a flame-retardant, it is preferred to add a polymeric bromine flame-retardant having brominated aromatic rings in side chains of the polymer such as polydibromophenylene oxide, polypentabromobenzyl acrylate, polypentabromobenzyl methacrylate, polytetrabromoxylylene bisacrylate, polytetrabromoxylylene bismethacrylate, poly(2,4,6-tribromo)styrene, or poly(2,4,5-tribromo)styrene in an amount of 2 to 20% by weight, preferably, 7 to 18% by weight, particularly, 9 to 15% by weight based on the total amount of the composition together with a flame-retardant auxiliary such as antimony tiroxide or antimony pentaoxide in an amount of 0.1 to 0.6 times, preferably, 0.2 to 0.5 times as much as the flame-retardant.

A method for producing the polyester resin composition of the present invention is not limited to a specific one and it can be produced according to a known method. Fox example, the polyester resin composition of the present invention is produced by premixing all the ingredients and then melt-kneading the mixture in an extruder or a kneader, or by by previously kneading several ingredients in an extruder or a kneader to obtain pellets and then melt-kneading the remaining ingredients with the pellets.

The polyester resin composition of the present invention does not require a special molding method and special molding conditions, and it can be subjected to molding under known molding conditions for conventional crystalline thermoplastic resins to give a molded product having high heat resistance, high dimensional accuracy and excellent mechanical properties. Accordingly, the polyester resin composition of the present invention can be used in molding of various molded members, sheet materials such as films or plates, fibrous materials, tubular materials, containers and the like. Further, the polyester resin composition of the present invention can be utilized as covering materials, coating materials and adhesives.

In the present invention, it is considered that the polyester and the ionomer salt, which do not have miscibility originally, show good miscibility by formulation of the bisoxazoline compound as a coupling agent between them and thereby satisfactory molding characteristics can be obtained without decrease in strength. Further, it is considered that impact resistance can be improved by formulation of the polyester elastomer.

The following Examples and Comparative Examples further illustrate the present invention in detail but are not to be construed to limit the scope thereof. In the Examples and Comparative Examples, all "parts" and "%'s" are by weight unless otherwise stated.

Evaluation of properties of test pieces in the Examples and Comparative Examples were carried out by the following test methods.

(1) Heat distortion temperature

According to ASTM D-648, heat distortion temperature of a test piece having 1/16 inch in thickness molded at the mold temperature of 70° C. was measured under the loading of 18.5 kg/cm$^2$.

(2) Flexural strength

Flexural strength was measured according to ASTM D-790.

(3) Tensile strength and tensile elongation

Tensile strength and tensile elongation were measured according to ASTM D-638.

(4) Impact strength

Impact strength was measured according to ASTM-D-256 with notch.

EXAMPLES 1-6 AND COMPARATIVE EXAMPLES 1 AND 2

Polyethylene terephthalate (100 parts) as the ingredient (A) was premixed with Surlyn 1707 (a sodium salt of ethylene-acrylic acid copolymer manufactured by Du Pont Co.) as the ionomer salt of the ingredient (B), 2,2-p-phenylene-bis(2-oxazoline) as the ingredient (C) and Glasslon (glass fiber manufactured by Asahi Fiberglass K.K.) in the amounts shown in the following Table 1. The mixture was fed to a hopper of a twin-screw extruder PCM 30 and melt-kneaded at the cylinder temperature of 270° to 280° C. to obtain compound chips. The compound chips were dried at 130° C. for 4 hours and were molded into test pieces by using an injection machine (manufactured and sold by Nissei Jushi Kogyo K.K. under the trade name of "FS 75") at the cylinder temperature of 260°-265°-275° C. and the mold temperature of 70° C. Properties of the test pieces obtained were evaluated. The results are shown in Table 1.

TABLE 1

| No. | Amounts (parts) | | | Heat distortion temperature (°C.) | Flexural strength (kg/mm$^2$) |
|---|---|---|---|---|---|
| | Ingredient (B) | Ingredient (C) | Glass fiber | | |
| Comp. Ex. 1 | 5.3 | 0 | 45.1 | 95 | 18.4 |
| Ex. 1 | 5.3 | 0.7 | 45.1 | 131 | 21.4 |
| Ex. 2 | 5.3 | 1.5 | 45.1 | 172 | 21.7 |
| Ex. 3 | 5.3 | 4.5 | 45.1 | 204 | 22.1 |
| Comp. Ex. 2 | 11.1 | 0 | 47.6 | 132 | 16.9 |
| Ex. 4 | 11.1 | 0.8 | 47.6 | 177 | 19.3 |
| Ex. 5 | 11.1 | 1.6 | 47.6 | 200 | 20.2 |
| Ex. 6 | 11.1 | 4.8 | 47.6 | 212 | 22.0 |

EXAMPLES 7-17 AND COMPARATIVE EXAMPLES 3-15

Polyethylene terephthalate as the ingredient (A) was premixed with the ionomer salt as the ingredient (B), the bisoxazoline compound as the ingredient (C) and the polyester elastomer as the ingredient (D) and glass fiber in the amounts as shown in the following Table 2A. The mixture was fed to a hopper of a twin-screw extruder PCM 30 and melt-kneaded at the cylinder temperature of 270° to 280° C. to obtain compound chips. The compound chips were dried at 140° C. for 4 hours and was molded into test pieces by using the injection machine FS 75 at the cylinder temperature of 260°-265°-275° C. and the mold temperature of 70° C. Properties of the test pieces obtained were evaluated. The results are shown in Table 2B.

TABLE 2A

| No. | Ingredients (parts) | | | | Glass* fiber |
|---|---|---|---|---|---|
| | (A) | (B) | (C) | (D) | |
| Ex. 7 | 85 | 5[1] | 2[2] | 15[3] | 0 |

TABLE 2A-continued

| No. | Ingredients (parts) | | | | Glass* fiber |
|---|---|---|---|---|---|
| | (A) | (B) | (C) | (D) | |
| Ex. 8 | 85 | 10(1) | 4(2) | 15(3) | 0 |
| Comp. Ex. 3 | 85 | 0 | 4(2) | 15(3) | 0 |
| Comp. Ex. 4 | 85 | 5(1) | 0 | 15(3) | 0 |
| Ex. 9 | 85 | 3(1) | 0.3(2) | 15(4) | 49.2 |
| Ex. 10 | 70 | 3(1) | 0.3(2) | 30(4) | 49.2 |
| Ex. 11 | 55 | 3(1) | 0.3(2) | 45(4) | 49.2 |
| Comp. Ex. 5 | 85 | 0 | 0.3(2) | 15(4) | 49.2 |
| Comp. Ex. 6 | 55 | 0 | 0.3(2) | 45(4) | 49.2 |
| Comp. Ex. 7 | 85 | 3(1) | 0 | 15(4) | 49.2 |
| Comp. Ex. 8 | 70 | 3(1) | 0 | 30(4) | 49.2 |
| Ex. 12 | 85 | 7(1) | 2(2) | 15(4) | 49.2 |
| Ex. 13 | 70 | 7(1) | 2(2) | 30(4) | 49.2 |
| Ex. 14 | 55 | 7(1) | 2(2) | 45(4) | 49.2 |
| Comp. Ex. 9 | 85 | 0 | 2(2) | 15(4) | 49.2 |
| Comp. Ex. 10 | 85 | 7(1) | 0 | 15(4) | 49.2 |
| Comp. Ex. 11 | 70 | 0 | 0 | 30(4) | 49.2 |
| Ex. 15 | 85 | 15(1) | 4(5) | 15(4) | 53.8 |
| Ex. 16 | 70 | 15(1) | 4(5) | 30(4) | 53.8 |
| Ex. 17 | 55 | 5(1) | 5(5) | 45(4) | 53.8 |
| Comp. Ex. 12 | 85 | 0 | 4(5) | 15(4) | 53.8 |
| Comp. Ex. 13 | 70 | 15(1) | 0 | 30(4) | 53.8 |
| Comp. Ex. 14 | 55 | 5(1) | 0 | 45(4) | 53.8 |
| Comp. Ex. 15 | 55 | 0 | 0 | 45(4) | 53.8 |

(1)Ethylene/methacrylic acid (85/15 (w/w)) copolymer 60% of which was neutralized with sodium ion.
(2)2,2'-(1,3-Phenylene)-bis(2-oxazoline)
(3)Butylene terephthalate/ε-caprolactone (70/30 (w/w)) block copolymer
(4)Ethylene terephthalate/ethylene glycol (60/40 (w/w)) block copolymer
(5)2,2'-Methylene-bis(2-oxazoline)
*Glasslon manufactured by Asahi Fiberglass K.K. in Japan

TABLE 2B

| No. | Tensile strength (kg/cm$^2$) | Tensile elongation (%) | Impact strength (kg · cm/cm) | Heat distortion temperature (°C.) |
|---|---|---|---|---|
| Ex. 7 | 647 | 48.2 | 8.5 | 78.9 |
| Ex. 8 | 629 | 39.5 | 9.8 | 80.2 |
| Comp. Ex. 3 | 564 | 27.6 | 3.6 | 58.1 |
| Comp. Ex. 4 | 482 | 7.8 | 2.8 | 67.2 |
| Ex. 9 | 1520 | 3.8 | 12.6 | 187.2 |
| Ex. 10 | 1430 | 4.7 | 17.8 | 187.2 |
| Ex. 11 | 1170 | 5.4 | 23.4 | 180.0 |
| Comp. Ex. 5 | 1270 | 2.9 | 9.7 | 68.1 |
| Comp. Ex. 6 | 970 | 4.8 | 19.8 | 56.0 |
| Comp. Ex. 7 | 1250 | 2.0 | 7.8 | 92.4 |
| Comp. Ex. 8 | 1040 | 2.3 | 11.2 | 89.2 |
| Ex. 12 | 1490 | 3.7 | 11.8 | 202.4 |
| Ex. 13 | 1480 | 4.5 | 15.6 | 195.6 |
| Ex. 14 | 1210 | 5.3 | 22.8 | 184.3 |
| Comp. Ex. 9 | 1500 | 2.6 | 8.9 | 67.9 |
| Comp. Ex. 10 | 1210 | 1.9 | 6.9 | 114.1 |
| Comp. Ex. 11 | 1140 | 3.4 | 14.8 | 61.9 |
| Ex. 15 | 1530 | 3.5 | 13.9 | 215.6 |
| Ex. 16 | 1420 | 4.2 | 16.2 | 201.8 |
| Ex. 17 | 1380 | 4.8 | 21.9 | 198.3 |
| Comp. Ex. 12 | 1540 | 1.8 | 7.8 | 68.9 |
| Comp. Ex. 13 | 980 | 2.8 | 6.5 | 143.2 |
| Comp. Ex. 14 | 670 | 3.0 | 7.1 | 121.0 |
| Comp. Ex. 15 | 880 | 3.3 | 14.8 | 56.0 |

As seen from Tables 1, 2A and 2B, when any one of the essential ingredients of the present invention is omitted, the properties of the compositions become inferior.

EXAMPLES 18–20

Test pieces were produced according to the same procedure as in Example 9 except that the amounts of the ingredients (A)–(D) and glass fiber were varied as shown in Table 3A and the flame retardants shown in Table 3A were used. Properties of the test pieces obtained were evaluated. The results are shown in Table 3B.

TABLE 3A

| No. | Ingredients (parts) | | | | Glass fiber | flame retardant | Sb$_2$O$_3$ |
|---|---|---|---|---|---|---|---|
| | (A) | (B) | (C) | (D) | | | |
| Ex. 18 | 85 | 3 | 0.3 | 15 | 49.2 | 9(6) | 3 |
| Ex. 19 | 70 | 3 | 0.3 | 30 | 49.2 | 10(7) | 3.3 |
| Ex. 20 | 55 | 3 | 0.3 | 45 | 49.2 | 12(6) | 4 |

(6)Polydibromophenylene oxide (PO-64P manufactured by GLC Co.)
(7)Poly(2,4,6-tribromo)styrene (Pyrocheck 68P13 manufactured by Ferro Corp.)

TABLE 3B

| No. | Flame* retardancy | Tensile strength (kg/cm$^2$) | Tensile elongation (%) | Impact strength (kg · cm/cm) | Heat distortion temperature (°C.) |
|---|---|---|---|---|---|
| Ex. 18 | V-0 | 1444 | 3.6 | 10.6 | 185.2 |
| Ex. 19 | V-0 | 1359 | 4.5 | 15.8 | 185.1 |
| Ex. 20 | V-0 | 1112 | 5.1 | 20.4 | 178.3 |

*measured with UL-94, 1/32 inch

Thus, the polyester resin composition of the present invention can provide a molded product in which crystallization progresses sufficiently even if molding is carried out at a low mold temperature such as 70° C. Further, the composition of the present invention has good molding characteristics and can provide a molded product having excellent mechanical strehgth such as impact resistance, heat distortion temperature and tensile properties, which is suitable for articles in electronic devices such as connectors, coil bobbins, CRT sockets and the like.

What is claimed is:
1. A polyester resin composition which comprises
   (A) polyethylene terephthalate or a copolyester containing at least 80 mol % of ethylene terephthalate repeating unit;
   (B) metal salt of a copolymer of ethylene and unsaturated carboxylic acid selected from the group consisting of acrylic acid and methacrylic acid;
   (C) polyvalent oxazoline compound of the formula:

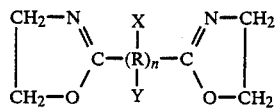

wherein R(X)(Y) is phenylene or methylene and n is 1;

(D) polyester elastomer selected from the group consisting of polyether ester block copolymers, polyester ester block copolymers and polyetherester ester block copolymers composed of aromatic polyesters as hard segments and poly (alkyleneoxide)-glycols and/or aliphatic polyesters as soft segments; and (E) glass fiber;

wherein the composition contains 100 parts by weight of the total amounts of (A) and (D) and the weight ratio of (A):(D) ranges from about 55:45 to 99.9:0.1, the amount of (B) is from 3 to 20 parts by weight per 100 parts by weight of the total amount of (A) and (D), the amount of (C) is from 0.1 to 5 parts by weight per 100 parts by weight of the total amount of (A) and (D), and (E) is present in a reinforcing amount.

2. A polyester resin composition is recited in claim 1 wherein (A) is polyethylene terephalate, (B) is metal salt of copolymer of ethylene and methacrylic acid, (C) is 2,2'-(1,3-phenylene)-bis(2-oxazoline) and (D) is ethylene terephthalate/ethylene glycol block copolymer.

3. A polyester resin composition as recited in claim 1 wherein (D) is selected from the group consisting of polyether ester block copolymers, polyester ester block copolymers and polyetherester ester block copolymers composed of aromatic polyesters as hard segments and poly(alkyleneoxide)glycols as soft segments.

* * * * *